(12) United States Patent
Reinelt et al.

(10) Patent No.: US 6,837,269 B2
(45) Date of Patent: Jan. 4, 2005

(54) ELECTROHYDRAULIC CONTROL DEVICE

(75) Inventors: Werner Reinelt, Bochum (DE); Franz-Heinrich Suilmann, Laer (DE)

(73) Assignee: DBT GmbH, Lunen (DE)

(*) Notice: Subject to any disclaimer, the term of this patent is extended or adjusted under 35 U.S.C. 154(b) by 0 days.

(21) Appl. No.: 10/099,301

(22) Filed: Mar. 15, 2002

(65) Prior Publication Data

US 2002/0129856 A1 Sep. 19, 2002

(30) Foreign Application Priority Data

Mar. 15, 2001 (DE) .......................... 101 12 496

(51) Int. Cl.⁷ .............................................. F15B 13/02
(52) U.S. Cl. .............................. 137/596.16; 137/454.2
(58) Field of Search .......................... 137/596.16, 454.2

(56) References Cited

U.S. PATENT DOCUMENTS

2002/0069920 A1 * 6/2002 Reinelt et al. ......... 137/625.66

FOREIGN PATENT DOCUMENTS

| DE | 32 20 867 A1 | 12/1983 |
| DE | 296 11 573 U1 | 10/1996 |
| DE | 196 46 611 C1 | 5/1998 |
| EP | 0 224 242 A1 | 6/1987 |

* cited by examiner

*Primary Examiner*—Gerald A. Michalsky
(74) *Attorney, Agent, or Firm*—Cook, Alex, McFarron, Manzo, Cummings & Mehler, Ltd.

(57) ABSTRACT

An electrohydraulic control device for use in the hydraulic systems of advancing support frames of underground mining equipment, which can be switched by means of switching plungers of electromagnets (24), and the directional control valves (3, 4) are put together from pilot control valve (14) and main control valves (3) arranged on a common axis, where by the pilot control valve (4) switches the main control valve (3) by means of a separate pressure medium supply to be found on an additional control pressure line, in which accepting borings (2) are suited for the acceptance of main control and pilot control valves (3, 4) constructed as cartridges which are plugged together.

17 Claims, 4 Drawing Sheets

ELECTROHYDRAULIC CONTROL DEVICE

The present invention relates to an electrohydraulic control device especially for use in the hydraulic systems of advancing support frames of underground mining equipment.

DE 196 46 611 C1 proposes a control device with a valve block, which has two accepting borings for the accommodation of a 3/2 way valve, which are switched by means of the switching plungers of electromagnets. These are inserted in magnet accepting borings formed in the valve block and are held in position by means of a case lid screwed onto one end of the valve block. The accepting borings for the 3/2 way valves lie on one axis with the magnet accepting borings, whereby for axial securing the directional control valves are screwed into a fine thread formed in the boring entry. The load connections, the return flow connection and a high pressure line connection are connected to the accepting borings via channels formed in the valve block, so that depending on the switched setting of the directional control valve the load is connected either with the return or with the high pressure line, in order to control the advancing support frame units correctly in their function. The switching plunger of each electromagnet acts via a pre-tensioned buffer spring on a first closing member, which is connected via pressure pins to further closing members, which lie with wide surfaces on sealing elements, in order to release or inhibit the through flow between the load and the high pressure or return flow line.

Since the advancing support frames are provided with a multiplicity of large and small volume props, a corresponding number of directional control valves is required, which preferably are arranged in a common valve block, so as the better to utilise the only limited assembly space available for the control devices in underground mining faces. To limit the pressure medium demand which has to be made available in the high pressure line, connecting lines with differing nominal connector connectors are used. Previously it has been customary to employ different directional control valves with different nominal sizes of load connectors and/or to arrange them in separate distributing blocks. Since the directional control valves are subject to constantly changing switching conditions and are exposed to high differences in pressure between the high pressure line and the return flow line, their wear is comparatively high. For maintaining the position of mining equipment with advancing support frames, this means that for each directional control valve a sufficient number of spare directional control valves must be available, in order to be able to exchange them following wear.

It is an aim of the present invention to produce an electrohydraulic control device, in which the previously mentioned disadvantages do not arise and which offers production and technical cost advantages over the state of the technology.

Accordingly a first aspect of the present invention relates to an electrohydraulic control device especially for use in the hydraulic systems of advancing support frames of underground mining equipment with a valve block, which is provided on its front end with load connections opening into connection borings, which has at least two accepting borings which form the accommodation space for directional control valves, which can be switched by means of a switching plunger of an electromagnet fixed to the valve block, and which is provided with a high pressure line and a return flow line, which run at right angles to the accepting borings and are optionally either connected to the load connections or separated from them, in which the accepting borings and the connection borings lie on one axis and pass directly from one into the other, so that the accepting space formed by the accepting borings forms space for all the directional control valves at the same time and for the acceptance of a directional control valve put together from a pilot control valve and a main valve and that additionally to the high pressure line and the return flow line a control pressure line is provided which makes possible a separate pressure medium supply, independent of the high pressure line for the switching of the main control valve. The alignment of the acceptance and connection borings on one axis especially offers substantial advantages with regard to production and assembly. Since both the pilot and the main control valves can be arranged on this axis, a favourable lead of the flow of hydraulic medium between the load connection and the high pressure line and the return flow line is attained. The separate pressure medium supply, taken separately from the high pressure line, prevents flutter in the pilot valve, so that it cannot come to a falling off of pressure and undesirable instable operating conditions. Apart from this, since in accordance with the invention all the accepting borings are formed the same, the same directional control valves can be used independently of the nominal size of the load connection, so that directional control valves which are subject to wear have only to be available in one size in the holding store.

In a preferred embodiment the valve block has fastening borings preferably displaced diagonally to each other in the side opposite to the load connections, onto which the electromagnet can be fixed in such a manner that each electromagnet mounts its associated directional control valve in the accepting boring and/or the electromagnet is arranged outside the valve block. The assembly can then be undertaken substantially more easily on the electrical side, without the hydraulic connections or similar having to be undone. The arrangement of the electromagnets on the outside of the valve block lessens their manufacturing outlay. Preferably the accepting boring merges into the connection boring via at least one stepped ledge, whereby this stepped ledge connects directly onto the accepting space and the connection borings have the same diameter for all the accepting spaces in the connection to the stepped ledge. By this measure the directional control valves constructed similarly to each other can always be supported on the hydraulic side of the accepting boring and by the provision of further steps in the valve or distributing block a matching for the different nominal diameters of the load connections can occur. Advantageously the connection borings and load connections have the same diameter for all the accepting spaces and externally interpositioned means such as reducing adapter sleeves or similar are provided for a reduction of the nominal diameter of the individual load connections. A correspondingly constructed valve block can then be used irrespective of the size of the required load connection nominal diameter even with different advancing support frames, so that manufacturing costs are reduced overall.

Alternatively or in addition the directional control valves can also be tensioned in the end having the connection borings by means of load connection couplers or similar. Advantageously a single return flow line is present, which serves as a common return for the hydraulic medium coming from the load connection and for the control medium coming from the pressure medium supply for switching the main control stage and/or the control pressure line, return flow line and the high pressure line are arranged parallel and alongside each other and/or between an upper and a lower row of accepting borings. Advantageously the accepting spaces and accepting borings are suited for the acceptance of main control and pilot control valves constructed as cartridges which can be plugged together and/or the control pressure line, return flow line and the high pressure line are arranged parallel and alongside each other and/or between an upper and a lower row of accepting borings. Preferably the return flow line is positioned between the control pressure line and the high pressure line and/or the connection for the return flow line is arranged on one cross side and the connections for the high pressure line and the control pressure line are arranged on the opposite cross side of the valve block.

A second aspect of the present invention is directed to an electrohydraulic control device especially for use in the hydraulic systems of advancing support frames of underground mining equipment with directional control valves which can be arranged in accepting borings of a valve block which is preferably constructed in accordance with the present invention as described above, which can be switched by means of the switching plungers of electromagnets, in which the directional control valves are put together from pilot control and main control valves arranged on a common axis, whereby the pilot control valve switches the main control valve by means of a separate pressure medium supply to be found on an additional control pressure line. The axial alignment of the whole valve stage, i.e. the switching plunger, the pilot and main valves and the load connection makes extremely fast and short switching times possible and reduces the incidence of flow losses. Owing to the separation of the pressure medium supply for switching the main stage from the high pressure line switched by it, pressure variations on the pilot control valve are prevented, so that even pressure peaks or pressure variations, which could arise on the switching of the main stage, which is at high pressure, can have no or in any case very little effect on the regulation of the pilot control valve. Especially flutter or oscillation of the pilot control valve can be effectively prevented by this measure.

Preferably the pilot control valve has a pilot control valve cartridge casing, which at one end has a cut-out for a valve insert with double acting valve pin and at the other end a sleeve extension as the accepting chamber for the control piston and/or a closing sleeve for the main control valve. The pilot control valve and its accepting chamber can then form a guide for the closing element of the main control valve. Advantageously the pilot valve cartridge casing has a circulating return flow channel around its outer side into which open piercings in the sleeve extension and at least one connecting boring opens, which is connected to the pressure medium supply, especially its controllable return flow line system.

To achieve the shortest possible switching paths preferably the valve insert includes a first sealing seat and a second sealing seat and if the valve pin includes a first valve cone, which can be pressed against the first valve seat by means of a valve spring and a second valve cone, which can be pressed against the second valve seat by means of the plunger of the electromagnet, whereby in the closed position preferably the first sealing seat closes the feed to the accepting chamber in the pilot valve and the second sealing seat closes its return flow. A favourable infeed flow of the control pressure medium can advantageously be achieved via a narrowing in the magnet side shaft section of the valve pin, which expediently is associated with a radial boring in the insert, with which the pressure medium can be taken out of the control pressure line to an infeed line opening in the accepting chamber, so as to move the closing element of the main control valve. In order to achieve the good sealing of the double acting valve pin, preferably the second valve seat is made floating and/or is formed from a centrally bored through barrel plug, which is provided on its rear side with a sealing ring for positioning and springing.

Advantageously a magnet-side shaft section of the valve pin is provided with a necking.

In a preferred embodiment the necking is associated with a radial boring in the insert, with which the pressure medium can be taken from the control pressure line to a feed line opening into the accepting chamber.

Especially the main control valve includes a main valve cartridge casing and a control piston open on the load connection side and provided with an axial blind hole, which has a valve cone web on its outer skirt, which is pretensioned against a sealing ring by means of a spring supported on a stepped through boring of the cartridge casing. The hydraulic closing force of the control piston, impacted by the high pressure line is hereby determined by the difference between the outer diameter of the valve cone web and the outer diameter of the control piston, provided with the blind hole, whereby with a constant closing force the achievement of greater, more flow favourable nominal widths in the blind hole of the control piston is made possible.

Advantageously the main control valve has a first sealing seat ring for the valve cone web blocking the high pressure side of the control piston and a second sealing seat ring for a closing sleeve blocking the inflow of the return flow line, whereby preferably the sealing seat rings abut against each other and are tensioned between the pilot and main valve cartridge casings. The sealing rings then form at the same time a seal between the pilot and main control valves, which can be plugged together and can in case of need be quickly and easily assembled by exchange.

In order to be able to restrict the number of lines in the valve block as far as possible, advantageously the pilot valve cartridge casing has in each case a circulating channel for the return flow line and the control pressure line and/or the main control valve casing has a circulating channel for the high pressure line. As further described above, the piercings in the accepting sleeve open into the channel for the return flow line, so that the cartridge casing of the main control valve requires no separate channel for the return flow line.

An example of an electrohydraulic control device made in accordance with of the present invention will now be described hereinbelow in relation to the accompanying drawings, in which.

Figure 1:
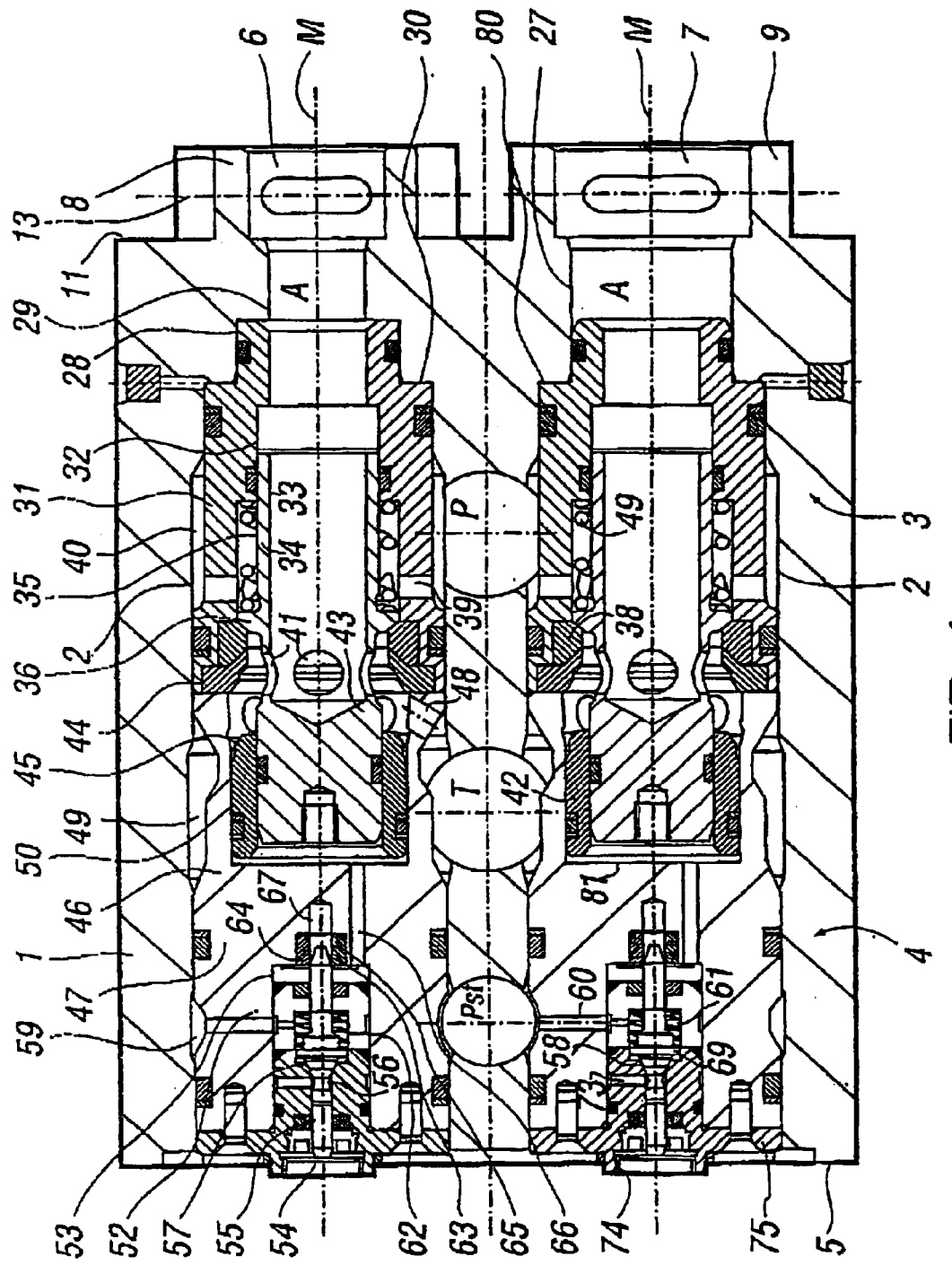
FIG. 1 shows a vertical cross-sectional through the valve block of a control device according to the present invention with 3/2-way valves installed.

FIG. 1 shows a vertical section through a single part valve block 1, in which two rows of accepting borings 2 are formed, above and below, into which a two part 3/2 directional control valve assembled from a main control valve cartridge 3 and a pilot control valve cartridge 4 is pushed in from the left-hand side 5, in FIG. 1 and FIG. 5. FIG. 1 permits it to be seen that the assembled directional control valve sits loosely in the accepting boring and can be removed from the accepting boring 2 towards the side 5. Firstly the construction of the valve and the distributing box 1 will be described with reference to FIGS. 1 to 5.

Figure 2:
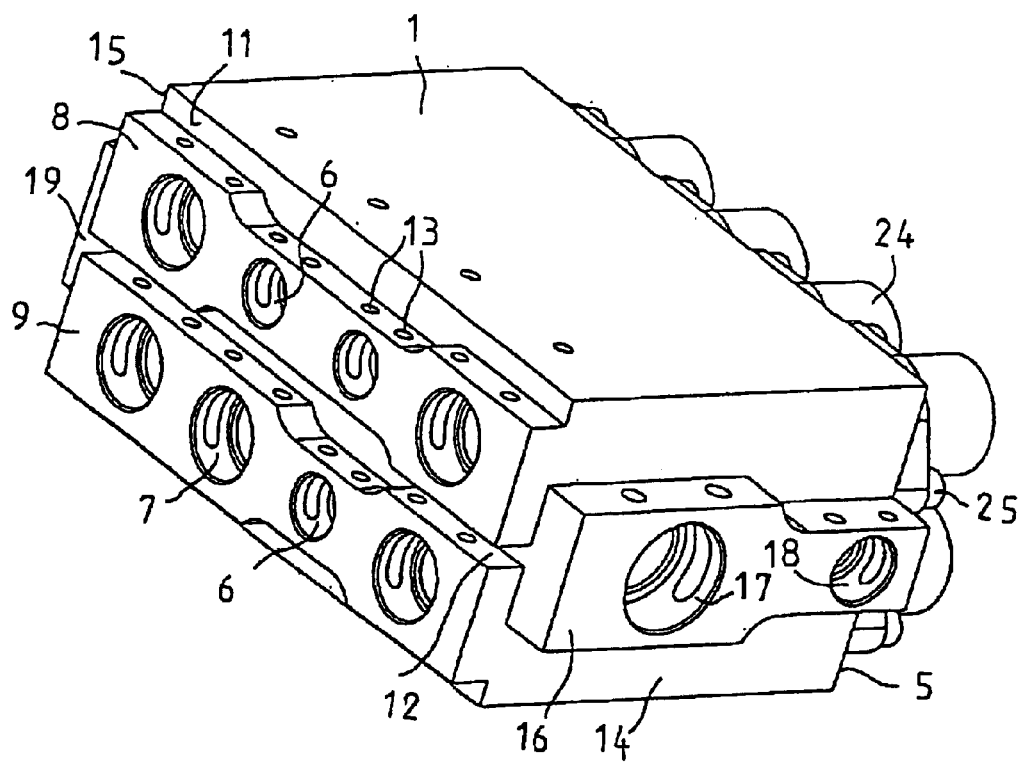
FIG. 2 shows a perspective view of the valve block shown in FIG. 1 with outer mounted magnetic valves.

FIG. 2 shows on the left a perspective view of the load side 11 of the valve block 1 with load connections 6 and 7 of different nominal diameters. The load connections 6, 7 are here arranged in each case in rails 8, 9 in each case one above the other, separated by a groove 12, whereby vertical borings 13 are formed in pairs in the rails for each load connection 6, 7, so as to be able to mount the hose connecting couplers for each load connection to the loads, not shown, for instance props of advancing support frames, using securing clamps onto the valve block 1. The forward cross side 14 of the valve block 1 in FIG. 2 is provided with a rail 16, in which on the one end a high pressure line connection 17, and on the other end a control pressure line connection 18 is formed to which, again using securing clamps, suitable connecting couplers for the associated hydraulic lines can be connected. The opposite cross side 15 is provided with a further rail 19, in which a return flow line 20 (FIG. 5) is formed. As especially FIG. 5 shows, the high pressure line connection 17 opens into a high pressure line P, the control pressure line connection 18 into a control pressure line $P_{ST}$ and the return flow line connection 20 into a return flow line T. The return flow line T is positioned between the control pressure line $P_{ST}$ and the high pressure line P, whereby all the lines P, T, $P_{ST}$ run parallel to each other, vertically to the central axis M of the accepting borings 2 and centrally between the rows of accepting borings 2 arranged above each other. Their diameters and separations are chosen such that all the lines $P_{ST}$, T, P open into both rows of accepting borings 2 via edge piercings 21, 22, 23.

Figure 3:
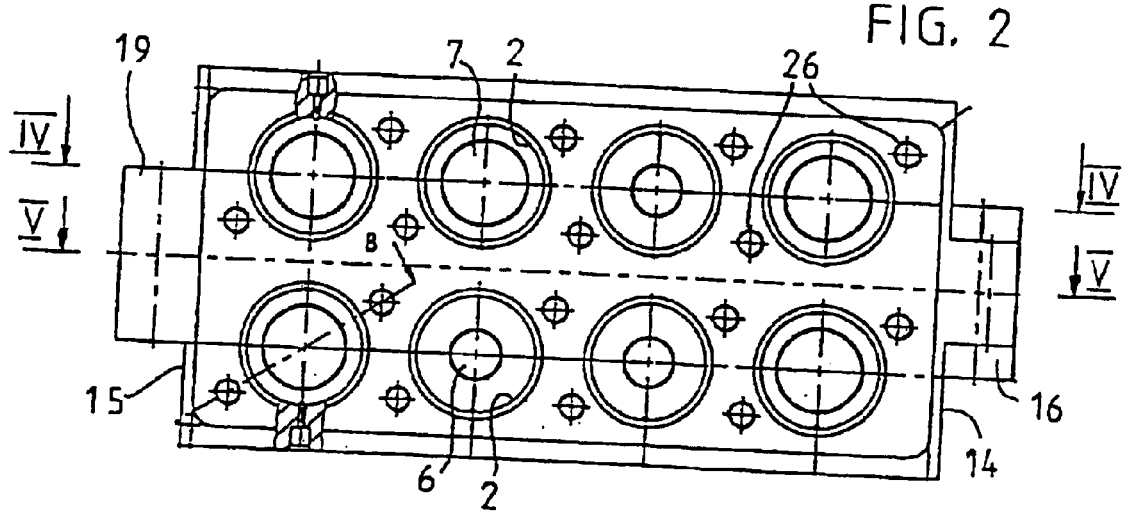
FIG. 3 shows a plan view of the rear end of the valve block shown in FIG. 2, with demounted magnetic valves.

As FIG. 2 shows, in the embodiment shown in valve block 1 eight accepting borings 2 are present in total, in two rows and on the rear end 5 a magnetic valve 24 is mounted externally for each accepting boring 2, which is fastened by means of screws 25. FIG. 3 shows that the screws engage in tapped holes 26 arranged diagonally displaced from each other in the end 5. The diagonal arrangement of the tapped holes 26 prevents these opening into the control pressure line $P_{ST}$ formed in the interior of the valve block 1 and achieves an optimum arrangement of the electromagnets 24 on the valve block 1 with a minimum height requirement of the valve block 1.

Figure 4:
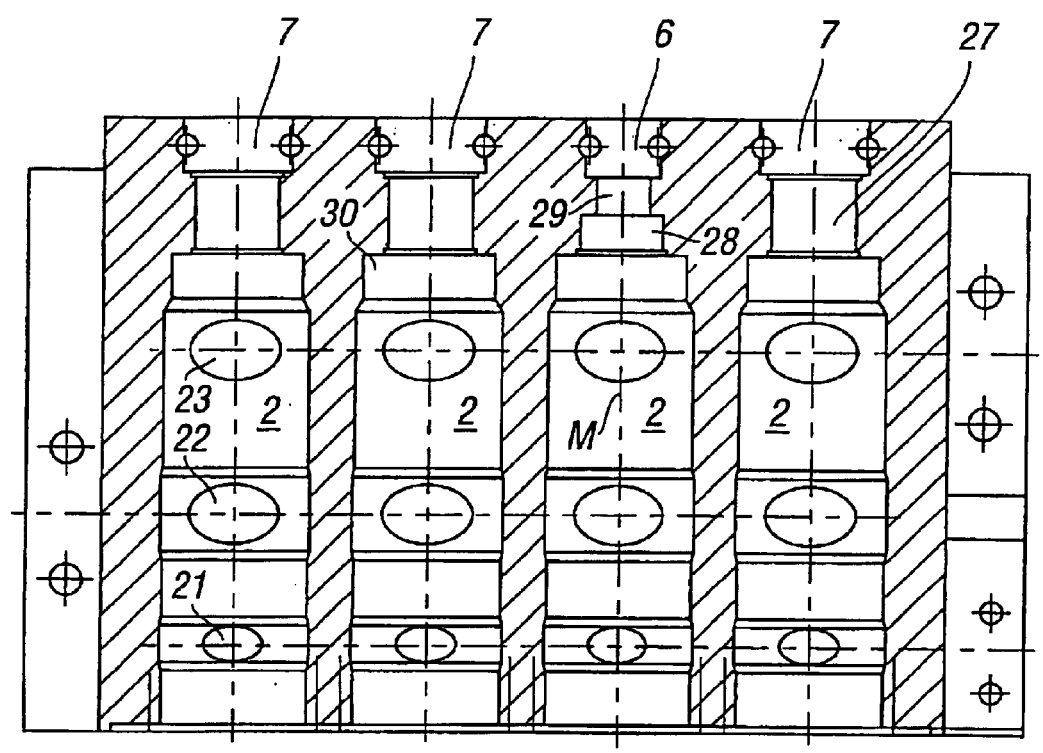
FIG. 4 shows a cross-sectional view along the line IV—IV in FIG. 3.
Figure 5:
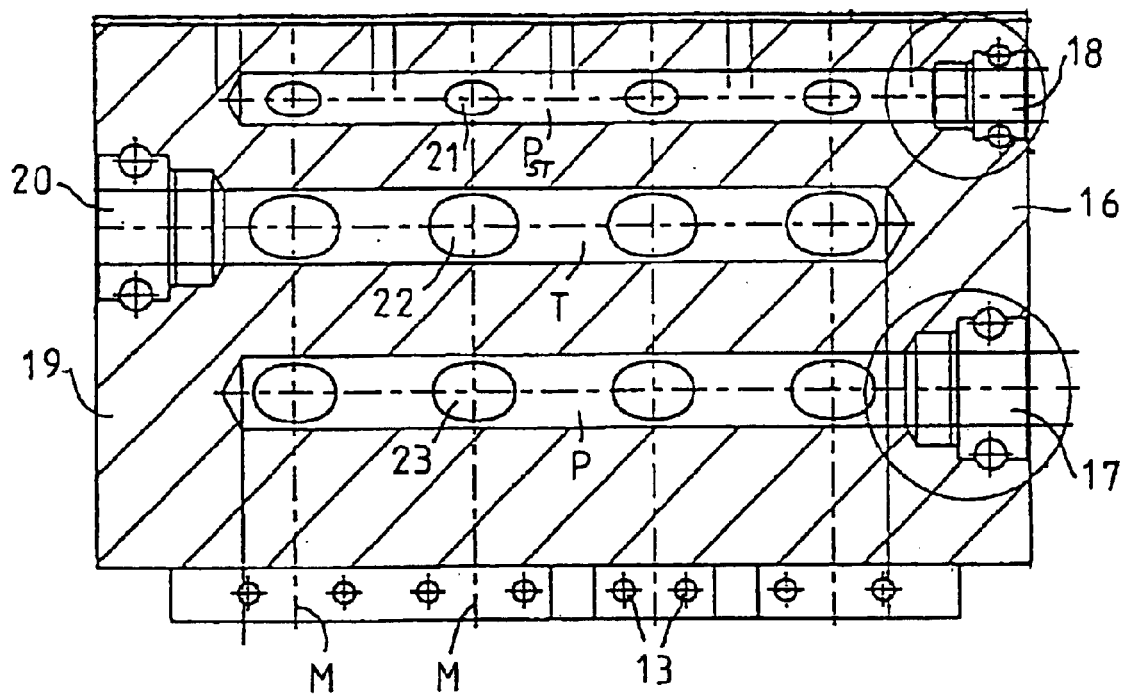
FIG. 5 shows a cross-sectional view along the line V—V in FIG. 3.

FIG. 4 shows a horizontal section through the upper row, in FIG. 3, of accepting borings 2, directed parallel to each other, of which three with large nominal diameters open into the load connections 7 and one into a load connection 6 with the smaller nominal diameter. The load connections 6, 7 open into or are components of accepting borings 27, 28, which have the same internal diameter as each other. The accepting boring 28 associated with the load connection 6 merges via a stepped boring section 29 into them. Between the connection borings 27, 28 and the accepting borings 2 a stepped ledge 30 is formed.

Reference is now again made to FIG. 1. The stepped ledge 30 forms an abutment shoulder for an annular shoulder 80 integrated in the casing 31 of the main control valve 4, so that the directional control valves can be supported here in the interior of the valve block 1. The disassembly of the directional control valves 3, 4 can either occur through the load connections 6, 7 and the load connection borings 27, 28, 29 from the load side, or in a preferable manner by means of an extraction device, not shown, which engages in a thread 74 in the head plate 75 of the pilot control valve, in order to draw out the directional control valve from the accepting boring 2. In FIG. 1 the arrangement can also be well seen of the lines $P_{ST}$, T, P formed perpendicular to the central axis M of the accepting borings 2, aligned with each other and the load connection borings 27 and 28, 29.

The construction and the method of operation of the directional control valve will now be explained. All the features of the main control valve 3 and of the pilot control valve 4 can be of independent inventive scope. FIG. 1 shows the main control valve 3 in the closed setting. The main control valve 3 has a single part main valve cartridge casing 31, which is provided centrally with a multiply stepped through boring 32, in whose forward section a control piston 34, provided with a blind boring 33 is guided. The blind boring 33 opens via the through boring 32 into the load line A and is impacted with its pressure. The sleeve-like part of the control piston 34 has on its outer circumference 35 a cone web 36, which is pre-tensioned by means of the valve spring 37 against a first, single part load connection side sealing seat ring 38 of X10CrNiMoTi 1810 material. In the closed condition the load connection side rear side of the valve cone web 36 is impacted with the pressure in the high pressure line P via several radial borings 39 and the circulating channel 40 of the casing 31. The load line A again impacts the opposite side of the valve cone web 36 with the pressure in the load line A, so that the closing force of the control piston and the sealing cone 36 on the sealing seat ring 38 is increased by the pressure difference and the diameter difference between the inner side of the sealing ring 38 and the outer side of the valve cone web 36. Since the pressure in the high pressure line P can amount to several hundred bar, a sufficient sealing at the sealing seat ring 38 is catered for.

A closing sleeve 42 is associated with the main control valve 4, which is guided back and forth movably on the rod formed control piston section 43 of the control piston 34 and in a manner yet to be explained can be pressed onto a second sealing seat ring 44, so as to separate the load line A from the return flow T. The closing sleeve 42 has a cone seating surface 45 on the load connection side, which works together with a corresponding conical sealing surface in the sealing seat ring 44. As can be seen from FIG. 1 the closing sleeve 42 is guided in a sealed manner internally on the control piston stump 43 and outside in a sleeve formed extension 46 of the pilot valve cartridge casing 47. The extension 46 forms consequently an accepting chamber 50 for the closed control piston section 43 and the closing sleeve 42. With the high pressure side closed the closing sleeve 42 is in the opening position on the base 81 of the accepting chamber 50, so that the fluid from the load line A can stream back via piercings 48 arranged around the circumference of the sleeve extension 46 into a channel 49 running around the outside of the cartridge casing 47 and into the return flow line T.

The link connection between the load line A and the return flow line T is separated by movement of the closing sleeve 42. To this end and to lift the control piston 34 from the sealing seat ring 38 control pressure medium from the control pressure line $P_{ST}$ is taken to the accepting chamber 50, after the pilot control valve 4 has been switched by the switching plunger, not shown, of the electromagnet 24 (FIG. 2). For this the switching plunger of the electromagnet moves the valve pin 51 out of the position shown to the right (not shown), by pressing on the valve tip 54 of the double acting valve pin 51 of the pilot control valve 4, which sits in a cut-out 53 in its cartridge casing 47 by means of an insert 52. As shown a shaft section 55 of the valve pin 51 joins onto the valve tip 54, which is provided with a necking 56 immediately before a magnet side valve cone 57. The valve cone 57 of the valve pin 51 is pre-tensioned in the direction of a sealing seat 58 by means of a valve spring 62 arranged in the interior 61 of the insert 52; the valve cone 57 lies on this first sealing seat 58, so that the control pressure medium from the control pressure line $P_{ST}$, which is in connection with the inner space 61 via a casing channel 59 and a radial boring 60, can overflow neither into the necking 56 nor into a further radial boring 63 in the position shown in FIG. 1. The valve pin 51 has a further valve cone 63 at the rearward end, which can work together with a second sealing seat 64 in a centrally through bored sealing body 65. This is floating mounted and cushioned on the rear side by an O-ring. In the switched position of the valve pin 51 according to FIG. 1 fluid can overflow out of the accepting space 50 via the axial boring 66 in the cartridge casing 47 past the valve cone 63 into a blind boring 67.

Figure 6:
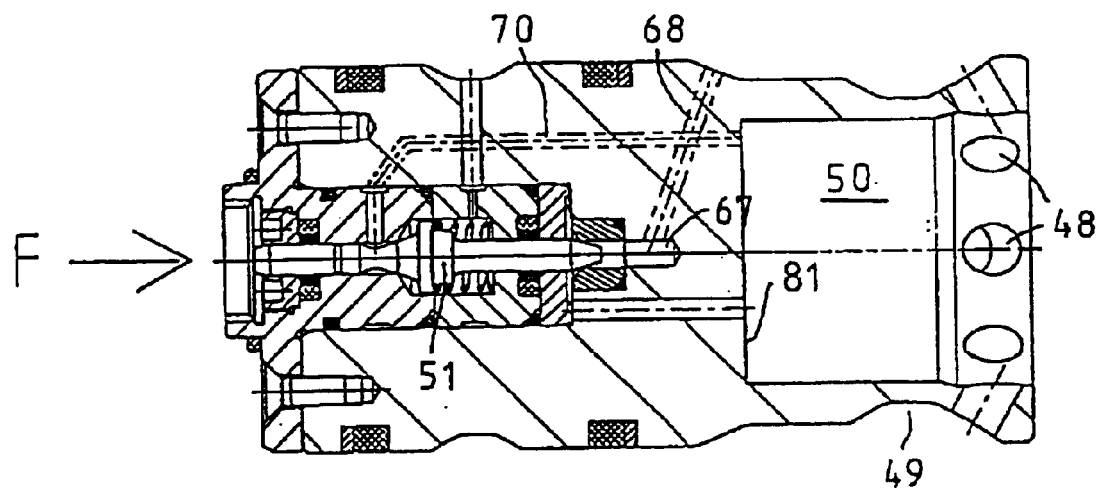
FIG. 6 shows a cross-section of the pilot control valve cartridge in detail with the infeed and return borings in the cartridge casing.

From this a connecting boring 68, shown in FIG. 6, branches off into the channel 49, which is permanently open to the return flow line T. On actuation of the electromagnet valve a driving force is exerted on the valve pin 51 as indicated by the arrow F in FIG. 6, so that it is moved to the right relative to the position shown in FIG. 6 and FIG. 1. This has the consequence that the valve cone 63 of the valve pin 51 closes on the sealing seat 64 and the necking 56 permits a through flow of the pressure medium from the control pressure line $P_{ST}$ via the radial boring 60 and the inner space 61 to the feed line 70 into the accepting chamber 50. The guide 69 of the valve pin 51 can to this end have through grooves or similar, not shown. The pressure building up owing to the pressure medium flowing into the accepting chamber 50 first moves the closing sleeve 42 because of the different surface dimensions and presses it onto the sealing seat ring 44, so that the link connection between the load line A and the return flow line T (FIG. 1) is blocked. Then the sealing cone 36 of the control piston 34 lifts from its sealing seat and is moved past the radial boring 39 in the cartridge casing of the main valve 3, so that then the pressure medium can stream abruptly out of the high pressure line P into the load line A.

The switching processes can be effected extremely quickly. Following the release of the electromagnet the valve pin 51 moves back again, so that the pressure medium can flow out of the accepting chamber 50 via the return flow boring 66 and the processes described above proceed in the reverse direction until the starting position as shown in FIG. 1 is reached again.

For a man skilled in the art a series of modifications arise, which fall within the scope of the Claims. The accepting boring 2 in the valve block 1 can, as shown, be provided with additional internal milled cut-outs, so as the broaden the width of the channels 49, 59. The load connection borings and the load connectors can all have the same diameter on the valve block and the diameter reduction to that of smaller connection couplers or hose diameters is made by external reducing tension sleeves or similar. Between the cartridge casings 31, 47 and the accepting boring 2 O-rings are arranged at suitable positions, so that no hydraulic medium can migrate into the neighbouring channels from the channels 40, 49 and 59.

What is claimed is:

1. An electrohydraulic control device having directional control valves for use in the hydraulic systems of advancing support frames of underground mining equipment, which can be switched by means of switching plungers of electromagnets, and directional control valves put together from pilot control valve and main control valves arranged on a common axis, whereby the pilot control valve switches the main control valve by means of a separate pressure medium supply to be found on an additional control pressure line, in which accepting borings are suited for the acceptance of main control and pilot control valves constructed as cartridges which are plugged together.

2. An electrohydraulic control device according to claim 1, in which the accepting space formed by the accepting borings forms space for all the directional control valves at the same time.

3. An electrohydraulic control device according to claim 1, in which the accepting boring merges into a connection boring via at least one stepped ledge, whereby this stepped ledge connects directly onto the accepting space and the connection borings have the same diameter for all the accepting spaces in the connection to the stepped ledge.

4. An electrohydraulic control device according to claim 1, in which a single return flow line is present, which serves as a common return for the hydraulic medium coming from a load connection and for the control medium coming from the pressure medium supply for switching the main control stage.

5. An electrohydraulic control device according to claim 1, in which the control pressure line, a return flow line and a high pressure line are arranged parallel and alongside each other and between an upper and a lower row of accepting borings.

6. An electrohydraulic control device according to claim 1, in which a return flow line is positioned between the control pressure line and a high pressure line and the connection for the return flow line is arranged on one cross side and the connections for the high pressure line and the control pressure line ($P_{ST}$) are arranged on the opposite cross side of a valve block.

7. An electrohydraulic control device according to claim 1, in which the pilot control valve has a pilot cartridge casing, which at one end has a cut-out for a valve insert with double acting valve pin and at the other end a sleeve extension as the accepting chamber for a control piston and a closing sleeve for the main control valve.

8. An electrohydraulic control device according to claim 7, in which the pilot control valve cartridge casing has a circulating return flow channel around its outer side, into which open piercings in the sleeve extension and at least one connecting boring opens, which is connected to the pressure medium supply, and its controllable return flow line system.

9. An electrohydraulic control device according to claim 7, in which the valve insert includes a first sealing seat and a second sealing seat and that the valve pin includes a first valve cone, which can be pressed against the first sealing seat by means of a valve spring, and a second valve cone, which can be pressed against the second sealing seat by means of the plunger of the electromagnet, whereby in the closed position the first sealing seat closes the feed to the accepting chamber in the pilot valve and the second sealing seat closes its return flow.

10. An electrohydraulic control device according to claim 9, in which the second valve seat is made floating and is formed from a centrally bored through barrel plug, which is provided on its rear side with a sealing ring for positioning and springing.

11. An electrohydraulic control device according to claim 7, in which a magnet-side shaft section of a valve pin is provided with a necking.

12. An electrohydraulic control device according to claim 11, in which the necking is associated with a radial boring in the insert, with which the pressure medium can be taken from the control pressure line to a feed line opening into the accepting chamber.

13. An electrohydraulic control device according to claim 7, in which the main control valve includes a main control valve cartridge casing and a control piston open on a load connection end and provided with an axial blind hole, which has a valve cone web on its outer skirt, which is pretensioned against a sealing seat ring by means of a spring supported on a stepped through boring of the cartridge casing.

14. An electrohydraulic control device according to claim 13, in which the sealing seat ring is made in one part and comprises an X10CrNiMoTi 1810 material.

15. An electrohydraulic control device according to claim 13, in which the main control valve has a first sealing seat ring for valve cone web blocking the high pressure side of the control piston and a second sealing seat ring for a closing sleeve blocking the inflow of the return flow line, whereby the sealing seat rings abut against each other and are tensioned between the pilot cartridge casing and the main valve cartridge casing.

16. An electrohydraulic control device according to claim 7, in which the pilot valve cartridge casing has in each case a circulating channel for a return flow line and the control pressure line and a main valve cartridge casing has a circulating channel for a high pressure line.

17. An electrohydraulic control device according to claim 1, in which a valve block has fastening borings displaced diagonally to each other in the side opposite to load connections, onto which the electromagnet can be fixed in such a manner that each electromagnet mounts its associated directional control valve in the accepting boring.

* * * * *